United States Patent
Oda et al.

(10) Patent No.: US 11,036,498 B2
(45) Date of Patent: Jun. 15, 2021

(54) INSTRUCTION SYSTEM, INSTRUCTION DEVICE, METHOD, AND PROGRAM

(71) Applicant: OMRON Corporation, Kyoto (JP)

(72) Inventors: Toshihiko Oda, Kusatsu (JP); Ryota Yamada, Tokyo (JP); Takeshi Naito, Ibaraki (JP); Sangryul Lee, Kusatsu (JP); Tetsuji Yamato, Yokohama (JP); Shuichi Misumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 89 days.

(21) Appl. No.: 16/465,247

(22) PCT Filed: Oct. 25, 2017

(86) PCT No.: PCT/JP2017/038537
§ 371 (c)(1),
(2) Date: May 30, 2019

(87) PCT Pub. No.: WO2018/110100
PCT Pub. Date: Jun. 21, 2018

(65) Prior Publication Data
US 2019/0294436 A1    Sep. 26, 2019

(30) Foreign Application Priority Data
Dec. 15, 2016    (JP) .............................. JP2016-242939

(51) Int. Cl.
*G06F 9/30*    (2018.01)
*G06F 16/38*    (2019.01)
(Continued)

(52) U.S. Cl.
CPC .......... *G06F 9/30003* (2013.01); *G06F 16/00* (2019.01); *G06F 16/38* (2019.01); *H04M 11/00* (2013.01); *H04Q 9/00* (2013.01)

(58) Field of Classification Search
CPC ...... G06F 9/30003; G06F 16/00; G06F 16/38; H04M 11/00; H04Q 9/00
See application file for complete search history.

(56) References Cited

U.S. PATENT DOCUMENTS 9,225,793 B2 * 12/2015 Dutta .................. H04L 67/2823
2012/0197856 A1 * 8/2012 Banka ................. H04L 67/2885
707/706

(Continued)

FOREIGN PATENT DOCUMENTS

EP         2801962 A1    11/2014
JP         2008-234429 A    10/2008
(Continued)

OTHER PUBLICATIONS

The International Search Report of PCT/JP2017/038537 dated Jan. 30, 2018.

(Continued)

*Primary Examiner* — Charles E Anya
(74) *Attorney, Agent, or Firm* — METROLEX IP LAW GROUP, PLLC

(57) ABSTRACT

An instruction device includes: an acquiring unit configured to acquire provided metadata, which is attribute information relating to one or more attributes of sensing data, the provided metadata having one or more hierarchy levels that contain information shared by a plurality of sensors; an acquiring unit configured to acquire usable metadata, which is attribute information relating to one or more attributes of an application; a matching unit configured to perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching (Continued)

degree; and an instruction unit configured to transmit a data flow control instruction that specifies the application and the extracted sensor.

20 Claims, 9 Drawing Sheets

(51) Int. Cl.
  *H04Q 9/00* (2006.01)
  *G06F 16/00* (2019.01)
  *H04M 11/00* (2006.01)

(56) References Cited

U.S. PATENT DOCUMENTS

| | | |
|---|---|---|
| 2014/0372561 A1 | 12/2014 | Hisano |
| 2016/0210862 A1 | 7/2016 | Hisano |
| 2016/0217202 A1 | 7/2016 | Klahre et al. |

FOREIGN PATENT DOCUMENTS

| | | |
|---|---|---|
| JP | 2013-008295 A | 1/2013 |
| JP | 5445722 B1 | 3/2014 |
| JP | 2014-225143 A | 12/2014 |

OTHER PUBLICATIONS

The Written Opinion of PCT/JP2017/038537 dated Jan. 30, 2018.
Feng Xiuzhen et al, "A study on tree matching model and algorithm towards metadata", Information Management and Engineering (ICIME), 2010 The 2ND IEEE International Conference on, Apr. 16, 2010, pp. 259-262, IEEE, Piscataway, NJ, USA, Relevance is indicated in the EESR issued on Dec. 4, 2019.
The extended European search report (EESR) dated Dec. 4, 2019 in a counterpart European patent application.
The Communication pursuant to Article 94(3) EPC dated Dec. 23, 2020 in a counterpart European patent application.

* cited by examiner

FIG. 9A

| Provided metadata ID | Usable metadata ID | Inter-level matching degree | Overall matching degree |
|---|---|---|---|
| S4 | C1 | 0 | – |

FIG. 9B

| Provided metadata ID | Usable metadata ID | Inter-level matching degree | Overall matching degree |
|---|---|---|---|
| S2 | C1 | 1 | – |
| S4 | C1 | 0 | 1 |

INSTRUCTION SYSTEM, INSTRUCTION DEVICE, METHOD, AND PROGRAM

TECHNICAL FIELD

The present invention relates to an instruction system, an instruction device, a method, and a program.

BACKGROUND ART

For each sensing device (also referred to as "sensing node") connected to a network, metadata is registered in the Sensing Data Trading Market (SDTM) (see, for example, JP 5445722B). In a case where, for example, each power sensor provided in a home is assumed as a sensing node, the number of sensing nodes corresponds to the number of households, that is, more than a million. Apart from description of the owner and address thereof, content such as sensing data content and distribution specification thereof is almost the same in the metadata of the nodes.

On the other hand, in order to improve the search efficiency, there is technology for hierarchizing data (see, for example, JP 2014-225143A), but this document does not describe matching the data.

SUMMARY OF INVENTION

Technical Problem

Typically, pieces of attribute information relating to sensing data are described together as one piece of metadata. Accordingly, in the above-described case, pieces of metadata of the nodes have substantially the same content. Therefore, the pieces of metadata to be registered in the SDTM have redundant information, which will unnecessarily use a memory or database or will result in a load on processing for searching for or communicating metadata. In matching processing, unnecessary calculation is thus performed since pieces of provided metadata have shared content.

The present invention was made in view of the aforementioned circumstances, and it is an object thereof to provide an instruction system, an instruction device, a method, and a program in which the amount of metadata to be stored is small, and with which matching of metadata can be performed promptly and accurately.

Solution to Problem

To solve the aforementioned problems, a first aspect of the present invention is directed to an instruction device including: a provided data acquiring unit configured to acquire provided metadata, which is attribute information relating to one or more attributes of sensing data to be output from a sensor, the provided metadata having one or more hierarchy levels that contain information shared by a plurality of sensors; a provided data storage unit configured to store the provided metadata;

a usable data acquiring unit configured to acquire usable metadata, which is attribute information relating to one or more attributes of an application that uses sensing data to provide a service; a usable data storage unit configured to store the usable metadata; a matching unit configured to perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching degree, which is a sum of the inter-level matching degrees of all of the hierarchy levels; a matching result storage unit configured to store the overall matching degree; and an instruction unit configured to transmit a data flow control instruction that specifies the application that corresponds to the usable metadata and the extracted sensor based on the overall matching degree, to a managing device, which manages control of transmitting data of a predetermined sensor to a predetermined application.

A second aspect of the present invention is such that the matching unit includes: a hierarchical data checking unit configured to check an identification sign contained in the provided metadata, the identification sign indicating a link to another hierarchy level; a hierarchical data acquiring unit configured to acquire provided metadata of the hierarchy level that corresponds to the identification sign from the provided data storage unit; and a hierarchical data matching unit configured to perform matching between the provided metadata of the sensor acquired for each hierarchy level and the usable metadata, and calculate the inter-level matching degree.

A third aspect of the present invention is such that, before calculating an inter-level matching degree of matching between given provided metadata and given usable metadata, the matching unit checks whether or not a corresponding calculated inter-level matching degree is stored in the matching result storage unit, and if it is confirmed that the corresponding inter-level matching degree is stored, calculation of a matching degree of the matching is omitted.

A fourth aspect of the present invention is such that the matching unit performs matching between the provided metadata and the usable metadata for each hierarchy level, calculates, for each sensor, an overall matching degree indicating a matching degree of the matching with the usable metadata based on the inter-level matching degrees, and extracts a sensor capable of providing the sensing data that satisfies a request of the application based on the overall matching degree, and the matching result storage unit stores the overall matching degree of the matching with the usable metadata for each sensor, and the instruction unit transmits a data flow control instruction that specifies the application that corresponds to the usable metadata and the extracted sensor, based on the overall matching degree.

A fifth aspect of the present invention is such that the provided data acquiring unit acquires the provided metadata by acquiring metadata, which is attribute information relating to one or more attributes of the sensing data, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is.

A sixth aspect of the present invention is such that the hierarchy includes one or more tree structures with one or more branches derived from the highest hierarchy level, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

According to the first aspect of the present invention, matching is performed between provided metadata, which has one or more hierarchy levels containing information shared by a plurality of sensors, and usable metadata, which is attribute information relating to one or more attributes of an application that uses sensing data to provide a service, for each of the hierarchy levels, and for each hierarchy level, an inter-level matching degree that indicates a degree of matching in the hierarchy level is calculated, and a sensor capable of providing the sensing data that satisfies a request of the application is extracted based on an overall matching degree, which is a sum of the inter-level matching degrees of all of the hierarchy levels, and as a result, the shared pieces of attribute information of the provided metadata are put together in one location, so that the amount of the metadata can be reduced as a whole. Furthermore, inter-level matching degrees for this can be promptly calculated, thus increasing the use efficiency of CPU resources. Furthermore, the total range of metadata to be compared is reduced, and thus it is possible to reduce the time required for performing matching processing. Moreover, the entire processing including matching is streamlined, and thus the quality of the data obtained by the matching is improved.

According to the second aspect of the present invention, matching between the provided metadata acquired for each hierarchy level of a sensor, and the usable metadata can be performed, and thus it is possible to calculate an inter-level matching degree.

According to the third aspect of the present invention, it is checked whether or not a corresponding calculated inter-level matching degree is stored in the matching result storage unit, and if it is confirmed that the corresponding inter-level matching degree is stored, calculation of a matching degree of the matching is omitted. Therefore, efficient calculation is possible without unnecessarily using calculation resources, thus increasing the use efficiency of CPU resources.

According to the fourth aspect of the present invention, by further calculating, for each sensor, an overall matching degree, which indicates a matching degree of matching with the usable metadata based on inter-level matching degrees, the instruction unit can transmit a data flow control instruction that specifies the application that corresponds to the usable metadata and the extracted sensor, based on the overall matching degree.

According to the fifth aspect of the present invention, the metadata from a plurality of sensors is hierarchized such that it is classified into pieces of metadata that contain information shared by a plurality of sensors, each of the pieces of metadata corresponds to any of the one or more hierarchy levels, and the lower the hierarchy level is, the smaller the number of sensors to which the metadata corresponds is. Therefore, only a small amount of data is needed because the provided metadata is efficiently hierarchized, and it is also possible to efficiently search for metadata when matching with usable metadata is performed. In other words, it is possible to reduce the memory amount, and also reduce the use of the CPU when metadata is used.

According to the sixth aspect of the present invention, the hierarchy may include, as an example, one or more tree structures with one or more branches derived from the highest hierarchy level, the lowest branch is in the lowest hierarchy level corresponding to the provided metadata specific to one sensor. Thus, the amount of the metadata can be reduced, and matching degrees for this can be promptly calculated, thus increasing the use efficiency of CPU resources.

Advantageous Effects of Invention

Thus, according to the aspects of the present invention, it is possible to provide an instruction system, an instruction device, a method, and a program in which the amount of metadata to be stored is small, and with which matching of metadata can be performed promptly and accurately.

BRIEF DESCRIPTION OF DRAWINGS

FIG. 9A is a diagram illustrating an example of a matching score table of matching scores obtained in step S803 in FIG. 8.

FIG. 9B is a diagram illustrating an example of the matching score table of matching scores obtained in step S806 in FIG. 8.

DESCRIPTION OF EMBODIMENTS

Figure 1:
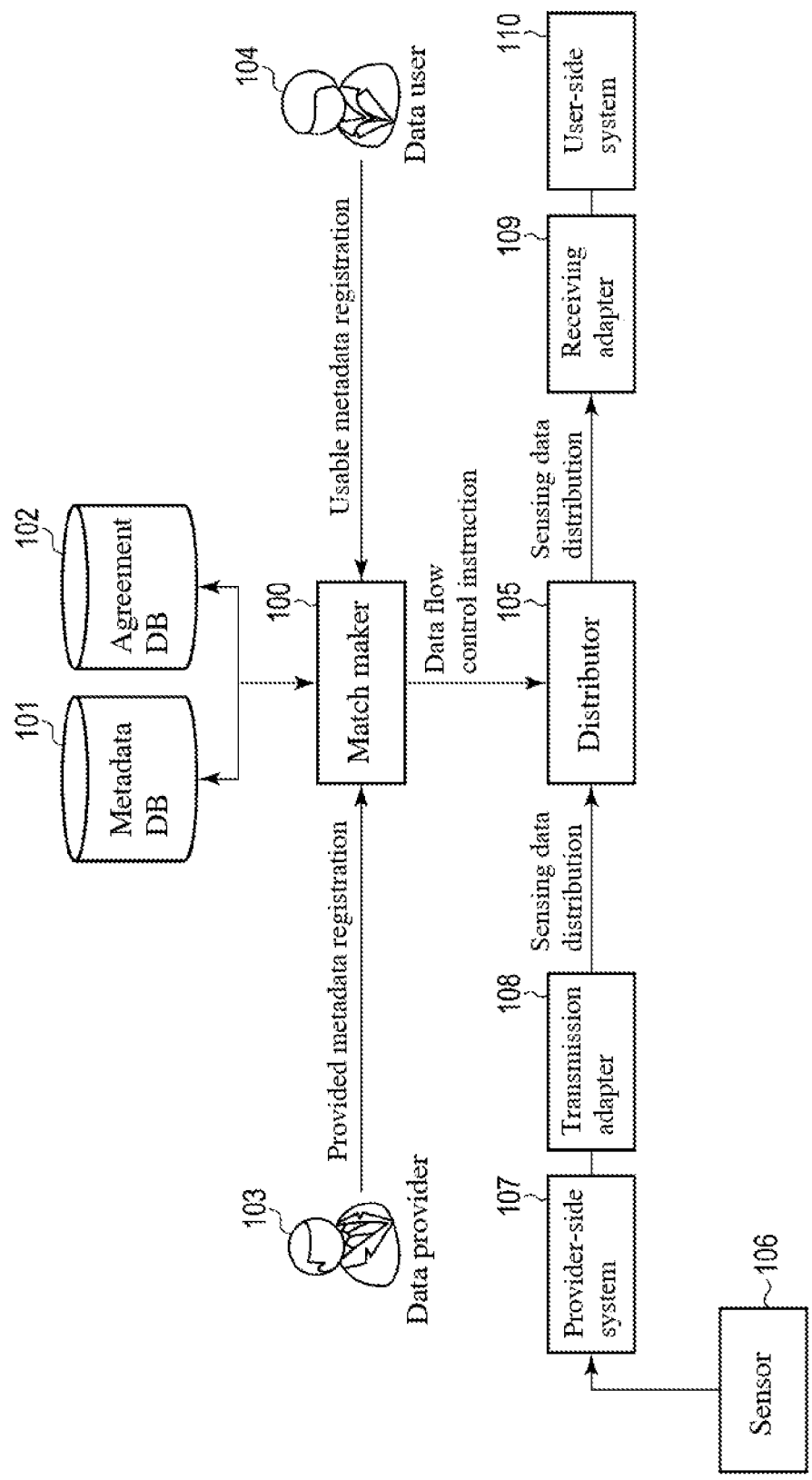
FIG. 1 is a diagram illustrating an overall system that includes a match maker, which is an instruction device according to an embodiment of the present invention.

Hereinafter, an instruction system, an instruction device, a method, and a program according to an embodiment of the present invention will be described with reference to the drawings. Note that, in the following embodiment, the components denoted with the same reference numeral are assumed to perform the same operation, and redundant descriptions are omitted.

The overall system with the instruction device of the embodiment will be described with reference to FIG. 1.

The system with the instruction device (also referred to as "match maker 100" in the embodiment) includes the match-maker 100, a metadata database (the term "database" is also abbreviated as "DB") 101, an agreement DB 102, a distributor 105, provider-side units, namely, a sensor 106, a provider-side system 107, and a transmission adapter 108, and user-side units, namely, a receiving adapter 109 and a user-side system 110. The sensor 106 is a device that detects a physical amount and a change thereof, and outputs the detection result as sensing data. The provider-side system 107 is physically or electrically connected to the sensor to obtain the sensing data therefrom. The transmission adapter 108 receives the sensing data from the provider-side system 107 and delivers the received sensing data to the distributor 105.

The match maker 100 stores provided metadata, which is provided by a data provider 103, performs matching between the provided metadata and usable metadata, which indicates data requested by a data user, and determines successfully matched data. The match maker 100 determines whether or not the data requested by the data user can be obtained from the provided metadata. If there is successfully matched data, the match maker 100 gives a data flow control instruction to the distributor 105 to obtain the data requested by the data user. The distributor 105 is a managing device that manages control of transmitting data of a predetermined sensor 106 to a predetermined application. The distributor 105 receives sensing data from the provider-side system, and distributes the received sensing data to the user-side system in accordance with the data flow control instruction. Note that the distributor 105 may also function to cache data for a certain period of time, detect an event, and perform sampling and transmission. The data flow control instruction refers to instruction information for distributing sensing data from an appropriate data provider 103 to an appropriate data user 104 based on a result of matching processing performed by the match maker 100, the data flow control instruction including information from the data provider 103 and information from the data user 104.

Provided metadata is registered in the match maker 100 by the data provider 103. Provided metadata is attribute information relating to one or more attributes of sensing data to be output from a sensor, and has one or more hierarchy levels containing information shared by a plurality of sensors.

Usable metadata is registered in the match maker 100 by the data user 104. Usable metadata is attribute information relating to one or more attributes of an application that uses sensing data to provide a service.

The metadata DB 101 stores provided metadata, usable metadata, and an overall matching degree between the provided metadata and the usable metadata.

The agreement DB 102 stores transaction agreement information (such as metadata IDs) between provided metadata and usable metadata that match each other. In this case, the data user 104 registers a metadata ID in the agreement DB 02 to make a data transaction agreement.

The provider-side system 107 passes distribution data from data sensed by the sensor 106 to the transmission adapter 108. The distribution data is data to be distributed to a user, and is typically text data, but may also be data of another format such as a binary format. The format of the distribution data is typically determined by a provider in an arbitrary manner. "Distribution data" is also referred to as "sensing data". In the present embodiment, the sensor 106 is a power meter included in a switchboard installed in each home. This power meter measures electric energy and an electricity bill, and outputs the measurements as sensing data. The power meter according to the present embodiment outputs, in addition to the sensing data of electric energy and an electricity bill, sound pressure data or vibration data, for example. In the later-described example of FIG. 3, a power meter of a type A is provided with a sound pressure sensor, and outputs sound pressure data, and a power meter of a type B is provided with a vibration sensor, and outputs vibration data.

The distributor 105 distributes, with respect to received event data, sensing data from an appropriate data provider 103 to an appropriate data user 104 in accordance with a data flow control instruction received from the match maker 100.

The receiving adapter 109 receives the sensing data from the distributor 105, and the user-side system 110 uses this sensing data to perform arithmetic processing, and generates information that corresponds to the purpose.

Figure 2:
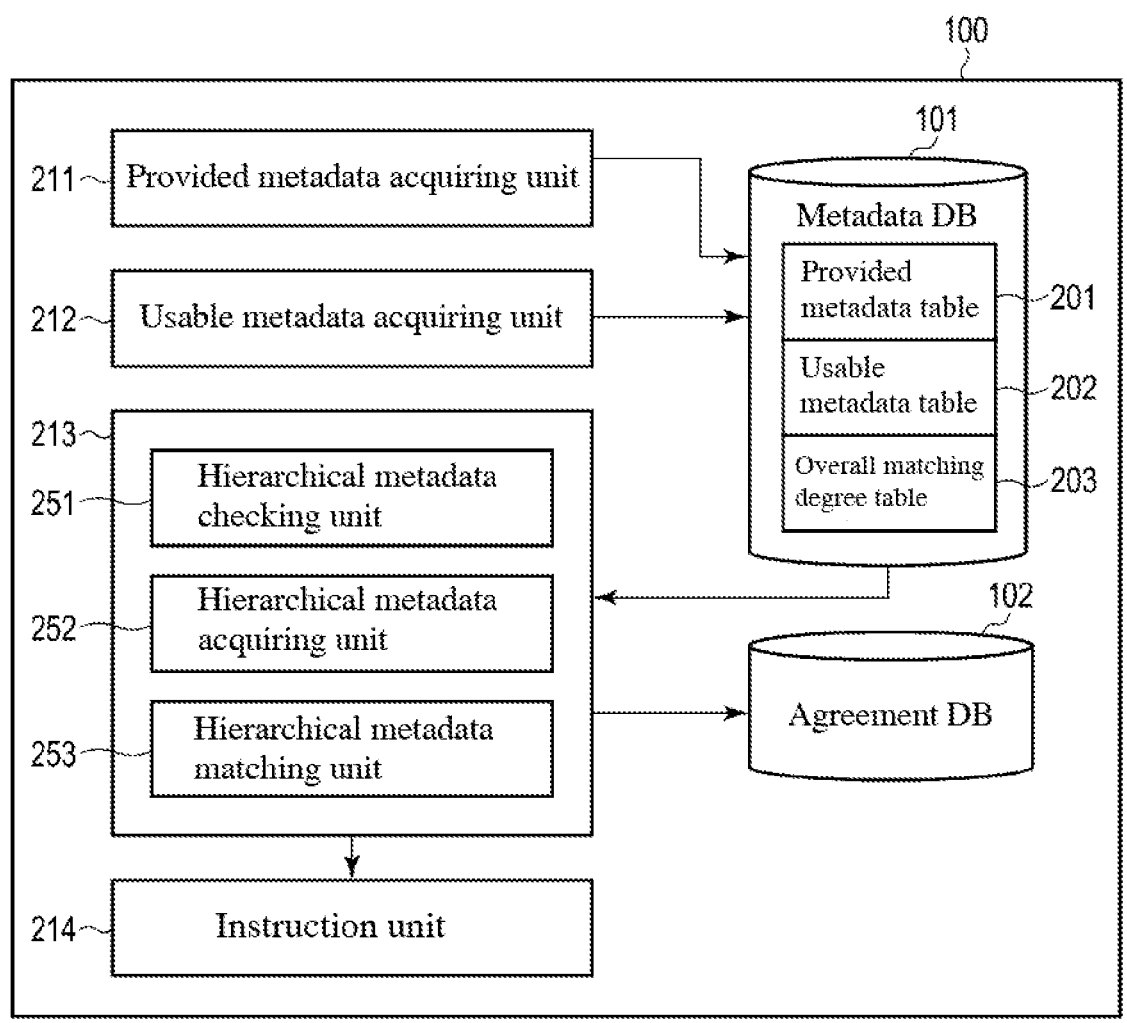
FIG. 2 is a block diagram illustrating the match maker in FIG. 1.

Note here that the match maker 100, the metadata DB 101, and the agreement DB 102 are separate units, but may also be incorporated into a match maker 100 (for example, a match maker 100 in FIG. 2). Furthermore, the provider-side system 107 and the transmission adapter 108 are provided as separate units, and the receiving adapter 109 and the user-side system 110 are provided as separate units, but the transmission adapter 108 may also be incorporated into the provider-side system 107, and the receiving adapter 109 may also be incorporated into the user-side system 110. Furthermore, the sensor 106 may also be incorporated into the provider-side system 107.

The match maker 100, which is an instruction device, shown in FIG. 1 will be described with reference to FIG. 2.

The match maker 100 includes a provided metadata acquiring unit 211, a usable metadata acquiring unit 212, a matching unit 213, an instruction unit 214, the metadata DB 101, and the agreement DB 102. The metadata DB 101 includes a provided metadata table 201, a usable metadata table 202, and a matching score table 203. The matching unit 213 includes a hierarchical metadata checking unit 251, a hierarchical metadata acquiring unit 252, and a hierarchical metadata matching unit 253. Note that the metadata DB 101 and the agreement DB 102 may also be provided outside of the match maker 100 as shown in FIG. 1, instead of being incorporated into the match maker 100.

The provided metadata acquiring unit 211 acquires metadata that is attribute information relating to one or more attributes of sensing data to be output from the sensor 106, namely, provided metadata that has one or more hierarchy levels containing information shared by a plurality of sensors. The provided metadata acquiring unit 211 acquires metadata for each sensor 106, and stores the obtained metadata in the metadata DB 101.

Then, the provided metadata acquiring unit 211 classifies the metadata that has a plurality of attributes and is accumulated for each sensor 106 in the metadata DB 101 into a plurality of groups, each of the groups including one or more attributes and being set so as to belong to a hierarchy level. Metadata according to the present embodiment includes a plurality of pieces of provided metadata for one sensor, and these pieces of metadata have a hierarchical structure.

The hierarchy is expressed by, for example, a tree structure with a plurality of branches in which a tip (root) of the tree corresponds to the highest hierarchy level, and the lowest branch is in the lowest hierarchy level. In the tree structure, metadata of the highest hierarchy level corresponds to the root, and each branch generated by branching corresponds to metadata of a lower hierarchy level. For example, metadata of the highest hierarchy level is metadata shared by all sensors 106, and metadata is more specific to a sensor the lower the hierarchy level is. One piece of metadata of the lowest hierarchy level is metadata that is specific to the corresponding sensor 106. However, the tree structure stored in the provided metadata table 201 does not necessarily have one root but may also have a plurality of roots. In this case, metadata of the highest hierarchy level is metadata that is shared by sensors 106 in a group but is different from that of sensors in another group. Furthermore, for example, setting may also be performed such that the higher the hierarchy level is, the more superordinate the concept of the attribute is. Note that the provided metadata includes a provided metadata ID (that is, an identification sign) and attribute data. The attribute data includes, for example, an attribute name and an attribute value that are associated with each other. In this case, the attribute name and the attribute value can indicate a hierarchy level (see illustration of FIG. 4 for details).

Here, the provided metadata acquiring unit 211 acquires metadata from the provider side, hierarchizes the provided metadata, and stores the hierarchized metadata in the provided metadata table 201, but such hierarchization of metadata may also be performed by the metadata DB 101 or the provided metadata table 201, or by another separate device. Alternatively, another device may also perform hierarchization of metadata on the data provider 103 side, or between the data provider 103 and the match maker 100.

The usable metadata acquiring unit 212 acquires, from the data user 104, usable metadata, which is attribute information relating to one or more attributes of an application that uses sensing data to provide a service. The usable metadata is information requested by the user, and contains a plurality of pieces of attribute information. The usable metadata acquiring unit 212 acquires usable metadata from the data user 104, and registers the acquired usable metadata in the usable metadata table 202. The usable metadata contains a usable metadata ID (that is, an identification sign) and attribute data. "Attribute data" contains, for example, an attribute name and an attribute value that are associated with each other.

The matching unit 213 performs matching between provided metadata and usable metadata for each hierarchy level, calculates, for each hierarchy level, an inter-level matching degree that indicates a degree of matching in the hierarchy level, and extracts a sensor capable of providing the sensing data that satisfies a request of the application based on the inter-level matching degrees. Alternatively, the matching unit 213 may also perform matching between provided metadata and usable metadata for each hierarchy level, further calculate, for each sensor, an overall matching degree, which indicates a matching degree of matching with the usable metadata based on inter-level matching degrees, and extract, based on the overall matching degree, a sensor capable of providing the sensing data that satisfies a request of the application.

The hierarchical metadata checking unit 251 checks (or searches for) and determines the provided metadata ID (identification sign) of metadata that indicates a link to another hierarchy level of metadata described in the provided metadata. The link to another hierarchy level is, for example, a link to the next higher hierarchy level, or a link to the next lower hierarchy level. Alternatively, the link may be a link to another piece of provided metadata to be referenced. In short, the link included in provided metadata may be of any type as long as all links lead to provided metadata of one corresponding sensor.

If a provided metadata ID is found and determined by the hierarchical metadata checking unit 251, the hierarchical metadata acquiring unit 252 acquires, from the provided metadata table 201, provided metadata of the hierarchy level that corresponds to the identification sign. The hierarchical metadata acquiring unit 252 acquires, for example, provided metadata of the hierarchy level described as the attribute value.

The hierarchical metadata matching unit 253 performs matching between the obtained provided metadata of the hierarchy level and the usable metadata, namely, matching between provided metadata of all of hierarchy levels for each sensor 106, and usable metadata, and calculates, for each sensor 106, a degree of the matching (degree of fit). In the following, an overall matching degree will be taken as an example of a matching degree of the matching.

The matching score table 203 records a usable metadata ID, a provided metadata ID, and a result of matching therebetween (for example, an overall matching degree). Furthermore, the matching score table 203 may also record, for each sensor 106, inter-level matching degrees calculated for the respective hierarchy levels. A sum of inter-level matching degrees of all of hierarchy levels that correspond to a sensor 106 serves as an overall matching degree of this sensor 106. Typically, the overall matching degree is set to 1 if matching is successful, and is set to 0 if matching is not successful, but the overall matching degree may also be set to any actual number. A configuration is also possible in which, for example, a matching degree between provided metadata and usable metadata is defined to calculate an overall matching degree and the calculated overall matching degree is normalized to a value between 0 and 1. A sensor 106 and an application that is determined using the usable metadata ID are specified.

The instruction unit 214 transmits a data flow control instruction to the distributor 105, which manages the sensor 106 and distributes sensing data to the user-side system 110, the data flow control instruction including information that specifies the sensor 106 extracted by the matching unit 213 and the application determined using the usable metadata ID, based on the matching degree.

The provided metadata table 201 stores provided metadata. The usable metadata table 202 stores usable metadata.

The matching score table 203 stores a result of matching (overall matching degree) between user-side metadata (also referred to as "application-side metadata") and provider-side metadata (also referred to as "sensor-side metadata"), and a result of matching (inter-level matching degree) between the user-side metadata and high hierarchy level metadata of the sensor-side metadata. Note that the matching score table 203 includes, for example, a provided metadata ID, a usable metadata ID, and an overall matching degree. Typically, the overall matching degree is set to 1 if matching is successful, and is set to 0 if matching is not successful, but the overall matching degree may also be set to any actual number. A configuration is also possible in which, for example, a matching degree between provided metadata and usable metadata is defined to calculate an overall matching degree and the calculated overall matching degree is normalized to a value between 0 and 1.

A configuration is also possible in which the units shown in FIG. 2 are built in chips that execute the respective functions, and the chips are combined with each other, and the CPU controls the entirety of the combined chips to operate the match maker 100.

If pieces of metadata are directly registered for each sensor 106 that collects sensing data, the number of data pieces is incredibly high, and large loads are exerted on matching processing. Specifically, in the matching processing, when provided metadata is compared between sensors 106, the provided metadata shares a large number of pieces of data, and thus matching calculation with the same provided metadata is required when matching with usable metadata is performed, resulting in unnecessary calculation.

However, according to the instruction device of the present embodiment, the following effects are achieved. Provided metadata can be associated with an inheritance source (next higher hierarchy level) or an inheritance destination (next lower hierarchy level). Attribute information of metadata of an inheritance source can be held as default attribute information in metadata of an inheritance destination. Accordingly, specific metadata can be created by adding, using the inheritance relationship, only attribute information serving as a difference from general-purpose metadata to the general-purpose metadata. As a result, the amount of metadata that has attribute information shared by the metadata is reduced as a whole because the pieces of shared attribute information are put together in one location. Accordingly, inter-level matching degrees for this can be promptly calculated, thus increasing the use efficiency of CPU resources. Furthermore, the total range of metadata to be compared is reduced, and thus it is possible to reduce the time required for performing matching processing. Moreover, the entire processing including matching is streamlined, and thus the quality of the data obtained by the matching is improved.

According to the present embodiment, in the field of matching of metadata, a hierarchical structure is provided to minimize data overlap between pieces of metadata, and a calculation result is cached in units of metadata of an inheritance source. Thus, it is possible to easily store and search for an intermediate result, using a metadata ID as a key, in the metadata DB 101.

Figure 3:
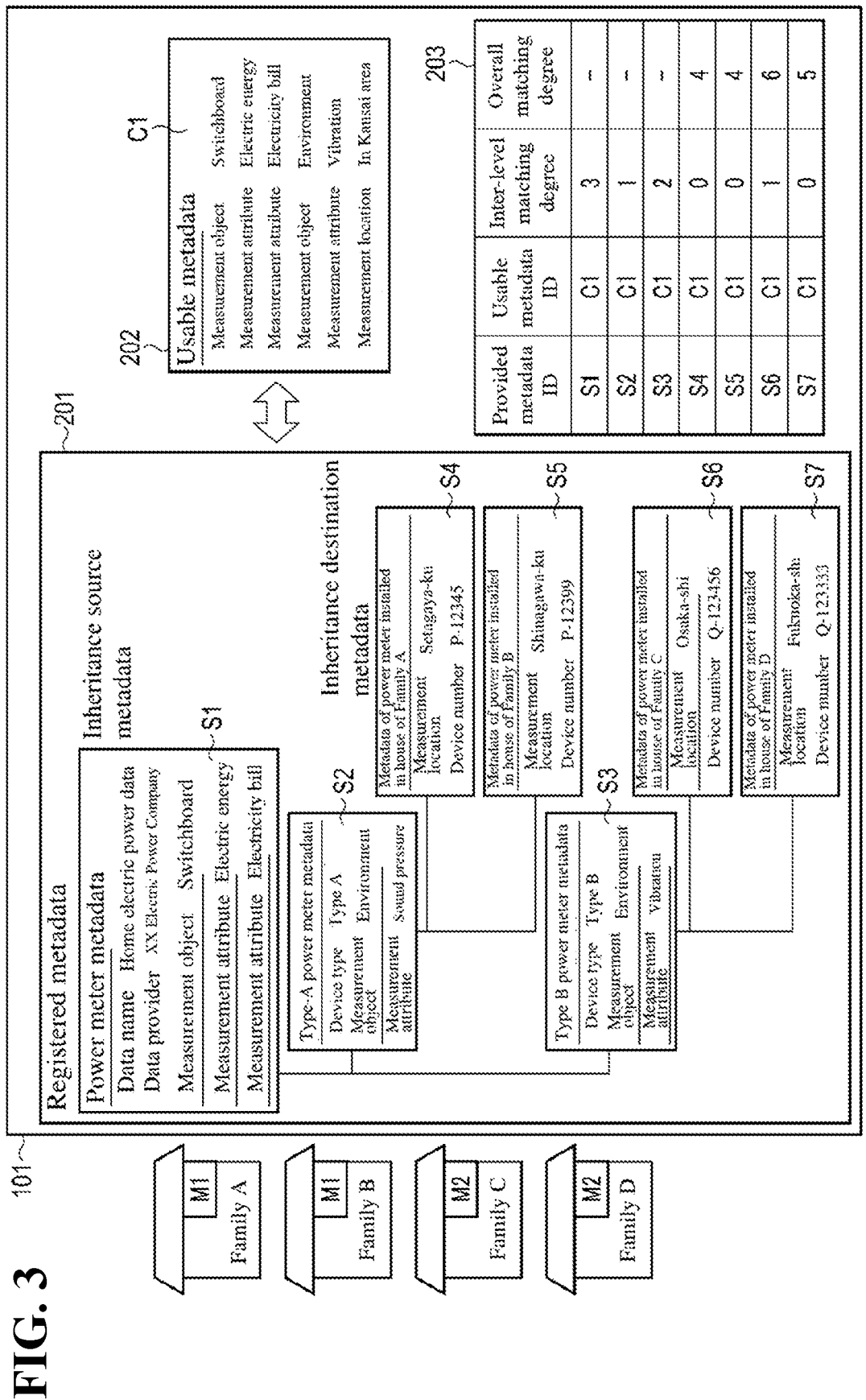
FIG. 3 is a diagram illustrating content of a metadata database shown in FIG. 2.

The following will describe metadata stored in the metadata DB 101, with reference to FIG. 3. From FIG. 3 and onwards, an example is taken in which a power meter for measuring sensing data of electric energy and an electricity bill is installed on a switchboard installed in each home, and metadata of the sensing data to be output by the power meter is registered for each household in the match maker. The power meters include, for example, the type-A power meter provided with a sound pressure sensor that outputs sound pressure data in addition to sensing data of electric energy and an electricity bill, and the type-B power meter provided with a vibration sensor that outputs vibration data in addition to sensing data of electric energy and an electricity bill.

The reference numeral 201 in FIG. 3 indicates content of the provided metadata table 201 in a tree structure for ease of understanding of the metadata hierarchy. In the example of FIG. 3, as provided metadata, seven types of data S1, S2, S3, S4, S5, S6, and S7 are shown with content thereof. S1 denotes inheritance source metadata that belongs to the highest hierarchy level, and includes four attribute names "data name", "data provider", "measurement object", and "measurement attribute", with which attribute values "home electric power data", "XX Electric Power Company", "switchboard", and "electric energy" are respectively associated. In this case, "electricity bill" is also associated with "measurement attribute". In the example of FIG. 3, when metadata is described, information relating to sensing data that is basic data of a power meter is described in S1. There are two pieces of provided metadata S2 and S3 in the next lower hierarchy level than the provided metadata S1, and there are two pieces of provided metadata S4 and S5 in the next lower hierarchy level than the provided metadata S2, and similarly, there are two pieces of provided metadata S6 and S7 in the next lower hierarchy level than the provided metadata S3. An attribute and an attribute value described in metadata of a higher hierarchy level are also held in metadata of a lower hierarchy level. Accordingly, metadata of the lowest hierarchy level has all of the attributes and attribute values of the metadata obtained by tracing back the inheritance sources. Note that there is a case where S2 and S3 have an inheritance relationship with S1. In this case, S1 is also referred to as "inheritance source" metadata of S2 and S3, and conversely, S2 and S3 are also referred to as "inheritance destination" metadata of S1.

The concept of the hierarchy is defined such that the higher the hierarchy level is the more superordinate (or abstract) it is, and the lower the hierarchy level is the more subordinate (or specific) it is. In the example of FIG. 3, S1 is metadata of "power meter" in which a power meter is generalized. S2 and S3 in the next lower hierarchy level than it are respectively metadata of "type-A power meter" and "type-B power meter", and respectively describe two different types of power meters with unique measurement attributes. S4 and S5 in the next lower hierarchy level than S2 are respectively metadata of "power meter installed in house of Family A" and "power meter installed in house of Family B", and respectively describe two different types of the type-A power meter with respect to information unique to the respective households. Similarly, S6 and S7 in the next lower hierarchy level than S3 are respectively metadata of "power meter installed in house of Family C" and "power meter installed in house of Family D", and respectively describe two different types of the type-B power meter with respect to information unique to the respective households.

As a result of metadata being described in a hierarchy in this manner, metadata of a power meter for each household that actually outputs sensing data can be obtained by merging information of metadata obtained by tracing back an inheritance relationship.

When performing matching, the matching unit 213 of the match maker 100 sequentially takes out the provided metadata of the lowest hierarchy level from the provided metadata table 201, performs matching between the taken-out provided metadata and usable metadata from the usable metadata table 202, and obtains the count of matching in attributes and attribute values. Then, the hierarchical metadata checking unit 251 checks whether or not this provided metadata contains the provided metadata of an inheritance source, and if such metadata is contained, matching is performed between this provided metadata of the inheritance source and the usable metadata, an overall matching degree is obtained, and the value thereof is stored in the table. As a result, the matching score table 203 shown in the lower right portion of FIG. 3 is obtained.

The processing for obtaining an overall matching degree will be described in detail later with reference to FIG. 5 and onwards.

Figure 4:
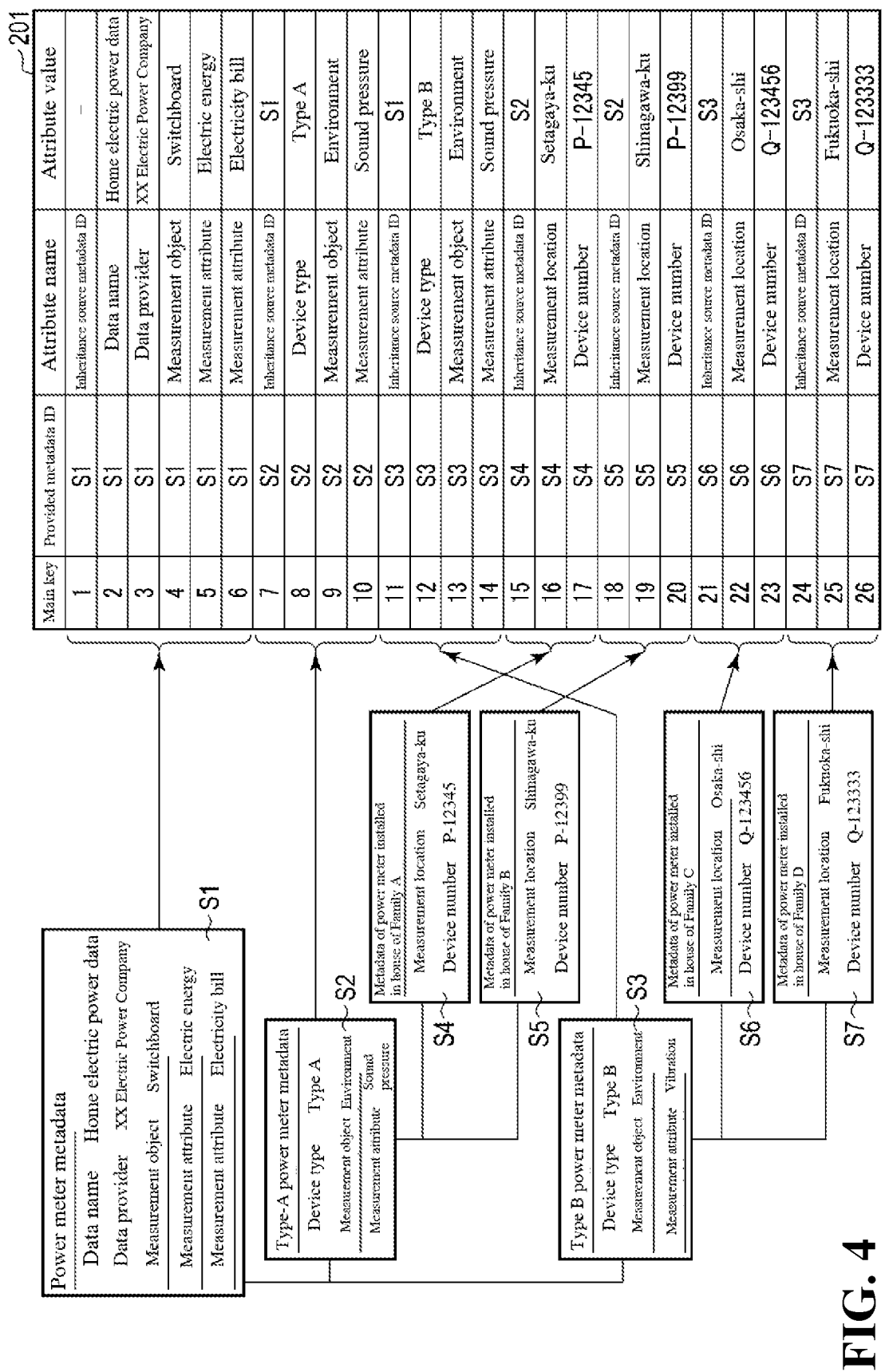
FIG. 4 is a diagram illustrating a relationship between a provided metadata table shown in FIG. 2 and provided metadata of an inheritance source or an inheritance destination.

Although, in FIG. 3, the provided metadata is expressed in a tree structure, an actual provided metadata table 201 stored in the metadata DB 101 is shown in the right portion of FIG. 4. FIG. 4 also shows the relationship between the metadata S1 to S7 shown in the tree structure in FIG. 3.

As shown in the right portion of FIG. 4, all of the pieces of provided metadata can be expressed in tables. S1 to S7 denoted as provided metadata IDs are included in the provided metadata table 201, and are used to identify the provided metadata. S1 corresponds to data elements with "main keys" 1 to 6 in the provided metadata table 201.

Inheritance source metadata is designated to the attribute values of the attribute name "inheritance source metadata ID" of the provided metadata IDs. In the case of the provided metadata S1, the space for this attribute value is empty, meaning that there is no inheritance source metadata. In the case of the provided metadata S2, the attribute value of "inheritance source metadata ID" is "S1", and it is thus clear that the inheritance source of S2 is S1. By checking the attribute value, the hierarchical metadata checking unit 251 can confirm metadata of an inheritance source (located in the next higher hierarchy level). Note that, although here the attribute value of the attribute name "inheritance source metadata ID" is checked, the designation is not necessarily needed if the hierarchical metadata checking unit 251 has confirmed in advance the position thereof. For example, if it is predetermined that the attribute value of the attribute name "inheritance source metadata ID" is set in the first main key, the attribute name "inheritance source metadata ID" may also be omitted. Other attribute names and attribute values in the provided metadata table 201 are as shown in FIGS. 3 and 4.

According to the present embodiment, it is possible to establish an inheritance relationship between metadata in this way. As a result, according to the present embodiment, the following effects are achieved. The inheritance relationship is such that the attribute information of metadata of an inheritance source can be held as default attribute information of metadata of an inheritance destination. This inheritance relationship indicates a relationship using an inheritance source metadata ID (see the description above with reference to FIG. 4).

With this, specific metadata can be created by adding, using the inheritance relationship, only attribute information serving as a difference from general-purpose metadata to the general-purpose metadata. As a result, such effects can be achieved that the amount of metadata that has attribute information shared by the metadata is reduced as a whole because the pieces of shared attribute information are put together in one location. Accordingly, it is possible to reduce the memory amount required for the metadata DB 101 to store metadata, and also reduce the use of the CPU when metadata is used.

The following will describe a procedure in which the matching unit 213 performs matching and obtains an overall matching degree, with reference to FIGS. 4, 5, 6, 7, 8, 9A, and 9B.

First, overview of calculation of an overall matching degree will be described with reference to FIG. 5.

Figures 5, 6:
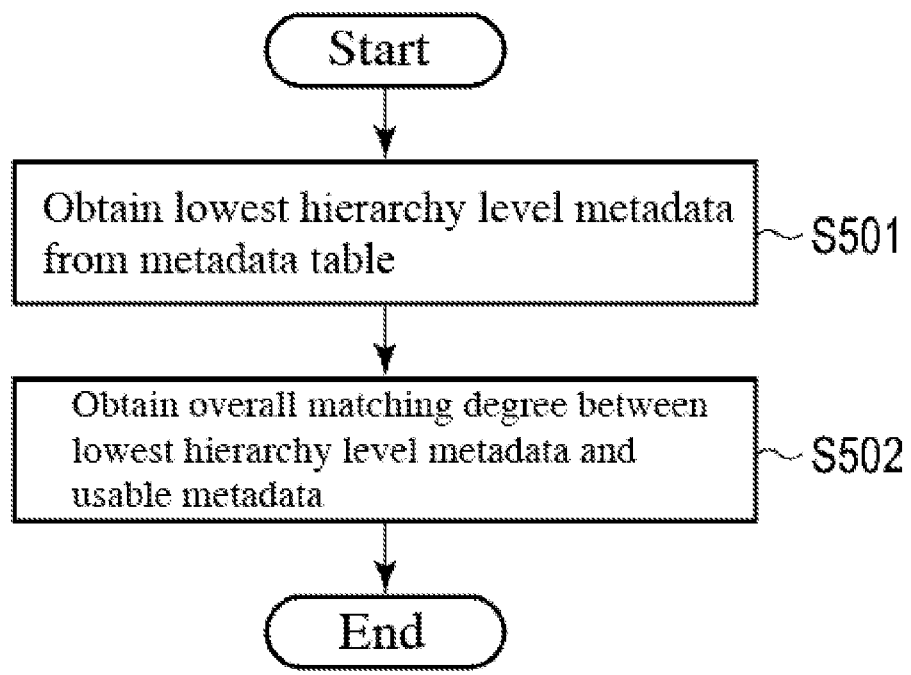
FIG. 5 is a flowchart illustrating a calculation procedure performed by a matching unit shown in FIG. 2.
FIG. 6 is a diagram illustrating an example of a matching score table of matching scores obtained in step S502 in FIG. 5.

The calculation shown in FIG. 5 is executed by the matching unit 213, the hierarchical metadata checking unit 251, the hierarchical metadata acquiring unit 252, and the hierarchical metadata matching unit 253.

(Step S501) Metadata of the lowest hierarchy level is obtained from the provided metadata table 201. In the example of FIG. 4, the pieces of metadata of the lowest hierarchy level are S4, S5, S6, and S7. Here, LOWEST_SID_LIST={S4, S5, S6, S7} is given. Note that "SID" or "sid" denotes a provided metadata ID.

(Step S502) Then, for each of the hierarchy levels from the lowest hierarchy level to the highest hierarchy level, an inter-level matching degree between the metadata of each sensor and the usable metadata is obtained. Lastly, an overall matching degree (a sum of the inter-level matching degrees of all of the hierarchy levels) between the provided metadata of the sensor and the usable metadata is obtained. In the example of the present embodiment, a sensor is specified based on provided metadata of the lowest hierarchy level, and thus the sum of inter-level matching degrees between the provided metadata from the lowest hierarchy level to the highest hierarchy level, and the usable metadata serves as an overall matching degree between the provided metadata of the sensor corresponding to the provided metadata, and the usable metadata. In the example of FIG. 4, the matching score table 203 shown in FIG. 6 is obtained. The usable metadata in this case is the usable metadata table 202 shown in FIG. 3. Note that it is not essential from which hierarchy level the calculation is started, and the calculation may be started from any hierarchy level as long as an overall matching degree between the provided metadata of a sensor and the usable metadata can be calculated.

Figure 7:
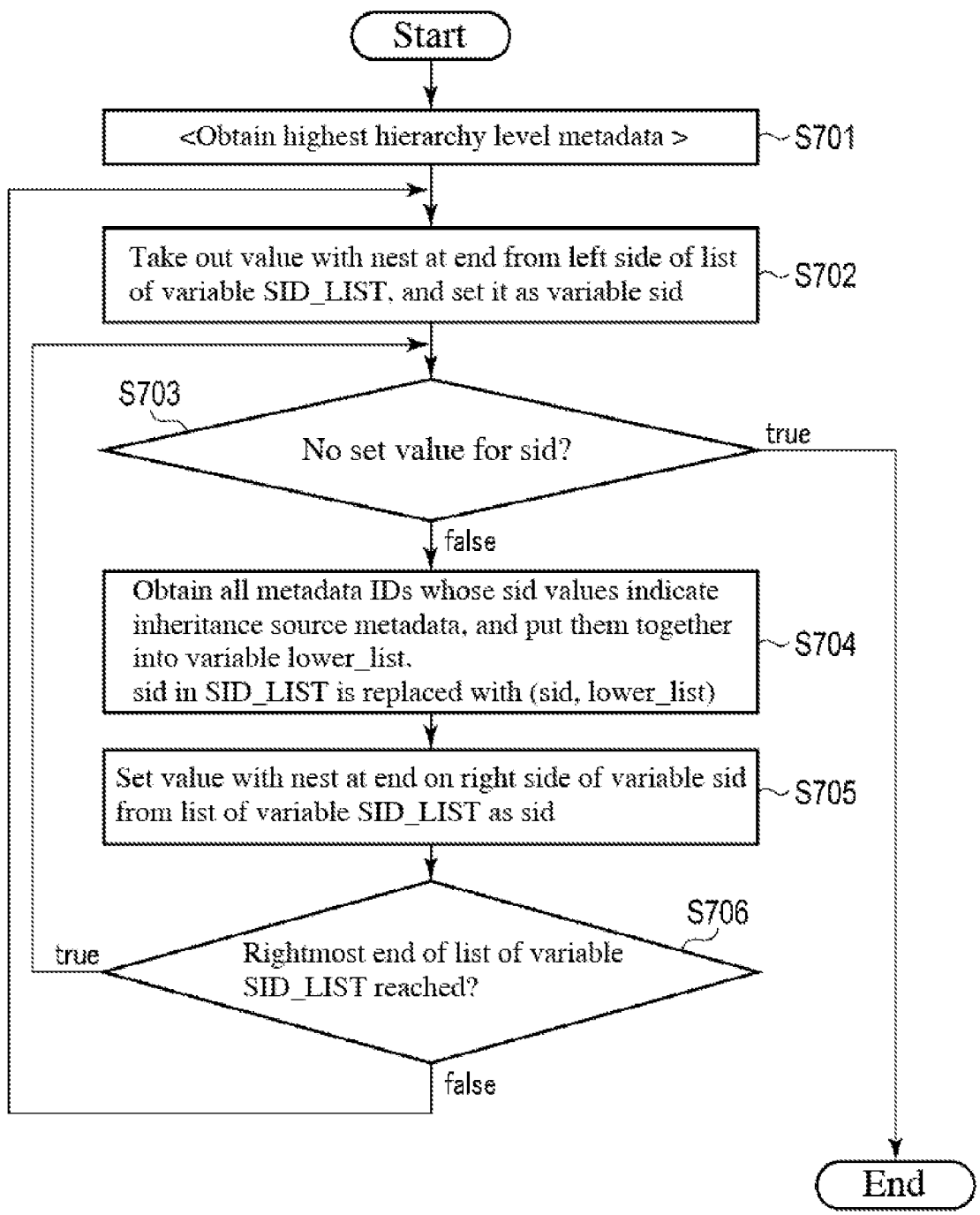
FIG. 7 is a flowchart illustrating a detailed calculation procedure performed in step S501 in FIG. 5.

The following will describe step S501 in FIG. 5 in detail with reference to FIG. 7.

(Step S701) First, metadata of the highest hierarchy level is acquired. The hierarchical metadata checking unit 251 and the hierarchical metadata acquiring unit 252 search for, in the provided metadata table 201, the provided metadata ID whose attribute value of the attribute name "inheritance source metadata ID" is "-", and adds the found provided metadata ID to variable SID_LIST. Note that, if the provided metadata table 201 has a single highest hierarchy level (only one root), there is only one piece of provided metadata whose attribute value is "-". In the example of the provided metadata table 201 in FIG. 4, SID_LIST=(S1) is given.

(Step S702) The hierarchical metadata checking unit 251 takes out, from the left side of the list of variable SID_LIST, the value with a nest at the end, and sets the taken-out value as a variable sid. In the case of SID_LIST=(S1), sid=S1 is given.

(Step S703) The hierarchical metadata checking unit 251 determines whether or not there is a set value for sid. If there is no set value for sid, the procedure is ended, whereas if there is a set value for sid, the procedure moves to step S704.

(Step S704) The hierarchical metadata checking unit 251 obtains all of the metadata IDs whose sid values indicate the inheritance source metadata, and puts them together into a variable lower_list. "sid" in the SID_LIST is replaced with (sid, lower_list). In the case of the provided metadata table 201 in FIG. 4, the lower_list of S1 indicates (S2, S3), and in the case of sid=S1, SID_LIST=(S1, (S2, S3)) is given. Furthermore, if there is no lower_list, (sid, NULL) is given. In the case of the example of FIG. 4, for example, (S4, NULL) is given.

(Step S705) From the list of variable SID_LIST, the value with a nest at the end on the right side of the variable sid is set as sid. In the case of SID_LIST=(S1, (S2, S3)), sid=S2 or sid=S3 is given. In this case, the cases of sid=S2 and sid=S3 are sequentially set.

(Step S706) It is determined whether or not the rightmost end of the list of variable SID_LIST has been reached. If the rightmost end has been reached, the procedure returns to step S703, and if the rightmost end has not been reached, the procedure returns to step S702. In the case of SID_LIST=(S1, (S2, S3)), S2 is not at the rightmost end, and thus the procedure returns to step S702, whereas S3 is at the rightmost end, and thus the procedure returns to step S703.

In the example of FIG. 4, when performing the steps in FIG. 7, SID_LIST=(S1, ((S2, ((S4, NULL), (S5, NULL))), (S3, ((S6, NULL), and (S7, NULL)))) is obtained. As a result, the pieces of metadata of the lowest hierarchy level are S4, S5, S6, and S7, which are metadata IDs with a nest at the end.

Figure 8:
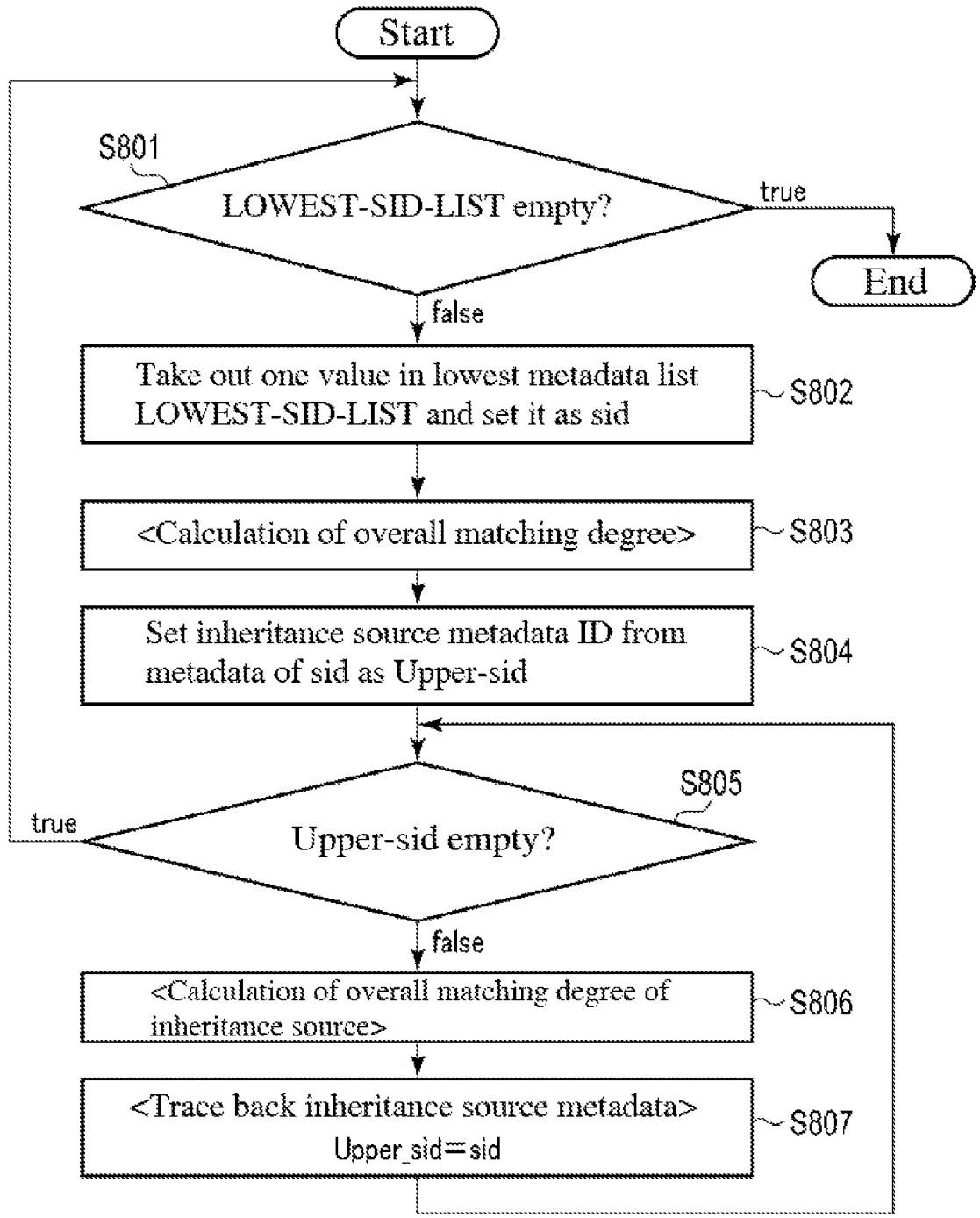
FIG. 8 is a flowchart illustrating a detailed calculation procedure performed in step S502 in FIG. 5.

The following will describe step S502 in FIG. 5 in detail with reference to FIGS. 8, 9A, and 9B.

(Step S801) It is determined whether or not a list LOWEST_SID_LIST of the metadata of the lowest hierarchy level is empty, and if it is empty, the procedure is ended, and if it is not empty, the procedure moves to step S802.

(Step S802) One of the values in the LOWEST_SID_LIST is taken out, and is set as "sid". In the example of FIG. 4, LOWEST_SID_LIST={S4, S5, S6, S7} is given, and if, for example, sid=S4 is first taken and this sid is set, LOWEST_SID_LIST={S5, S6, S7} will be given. If the following steps when sid=S4 are completed, calculation will be performed when S5, S6, and S7 are sequentially set as "sid".

(Step S803) Metadata of "sid" is taken out from the provided metadata table, attribute names and attribute values of the metadata and the usable metadata (cid) are compared with each other, the score is incremented if the matching is successful, and the resultant value is registered as the overall matching degree. Note that "CID" or "cid" denotes a usable metadata ID. In the case of sid=S4, the matching score table 203 is as shown in FIG. 9A, and there is no overall matching degree.

(Step S804) The inheritance source metadata ID of the metadata of "sid" is set as Upper_sid. In the case of sid=S4, Upper_sid=S2 is given.

(Step S805) It is determined whether or not Upper_sid is empty. If it is empty, the procedure returns to step S801, and if it is not empty, the procedure moves to step S806.

(Step S806) In the matching score table 203, if there is an "inter-level matching degree" that satisfies the provided metadata ID of Upper_sid and the usable metadata ID of cid, this value is added to the "overall matching degree" of sid. In the case of Upper_sid=S2, the intermediate matching score for the usable metadata ID=C1 is 1, and the procedure moves to step S807. If there is no "inter-level matching degree", 0 is set for the inter-level matching degree, and the procedure moves to step S807.

The values of the calculation results are registered in the "inter-level matching degree" together with the provided metadata ID and the usable metadata ID, and are added to the "overall matching degree" of sid of the lowest hierarchy level. In the case of sid=S4, the result is as shown in FIG. 9B.

(Step S807) Assuming that sid is the Upper_sid in step S806, it is determined in the next instance of step S805 whether or not this Upper_sid is empty. If, in step S806, Upper_sid is S2, determination in step S807 is made assuming that sid is S2, and in the next instance of step S805, the determination is made with reference to the provided metadata table 201 based on the fact that the inheritance source metadata ID of S2 is S1, and the procedure moves to step S806. Here, the provided metadata ID is S1, and the usable metadata ID is C1, and in this case, the inter-level matching degree results in 3, and the overall matching degree of the provided metadata ID of S4 results in 1+3=4.

When moving to step S807, there is no inheritance source metadata ID of S1, and thus Upper_sid is empty. As a result, the procedure will return to step S801 from step S805. In step S801, one of the values in LOWEST_SID_LIST={S5, S6, S7} is taken out. By performing the calculation until the end, an overall matching degree in the matching score table 203 shown in FIG. 3 will be obtained.

Figure 10:
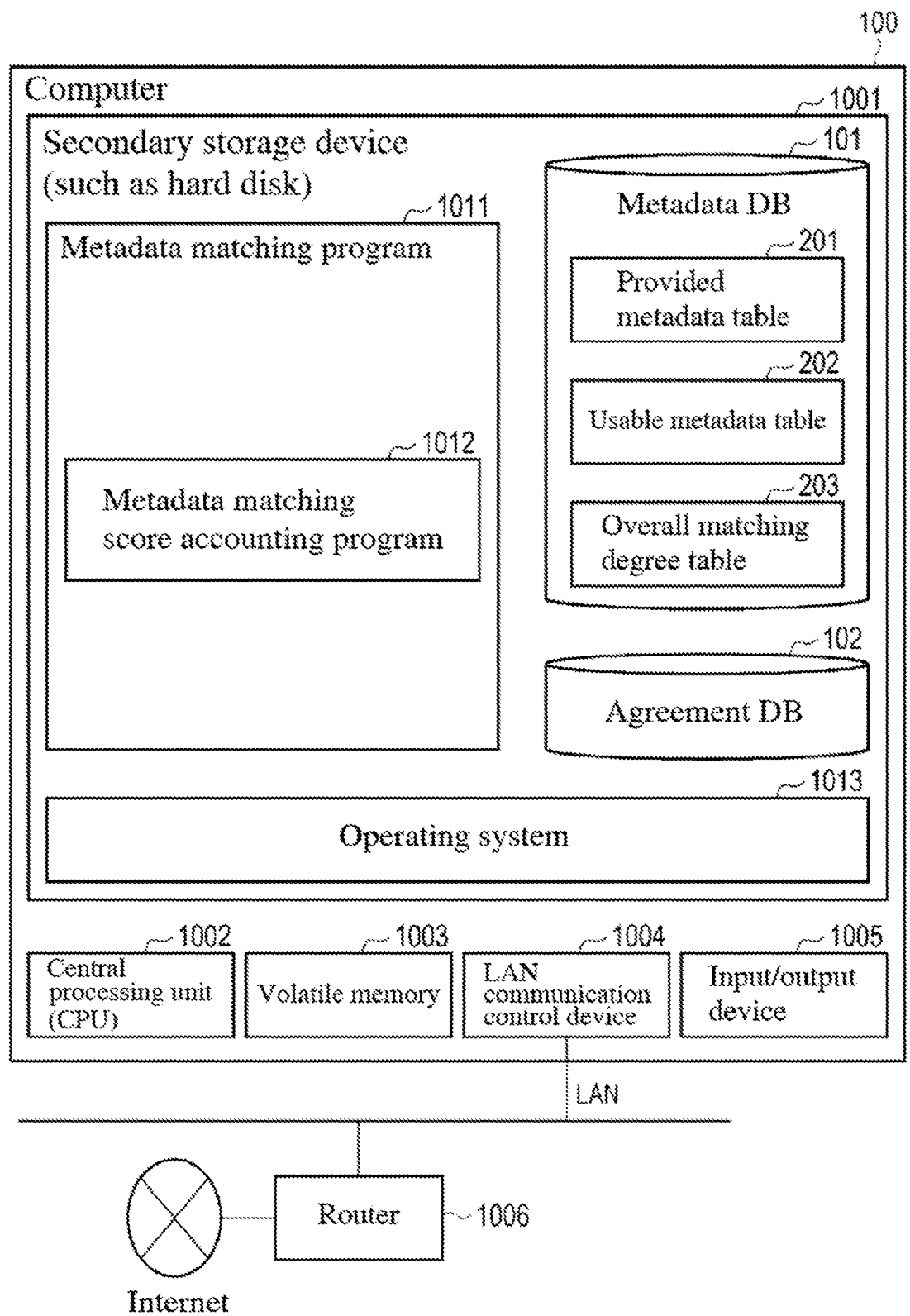
FIG. 10 is a diagram illustrating an example of a case where the match maker in FIG. 2 is realized by a program.

The following will describe a case where main operations of the match maker 100 shown in FIG. 2 are processed by a program with reference to FIG. 10.

The match maker 100 is provided with a secondary storage device 1001, a central processing unit (CPU) 1002, a volatile memory 1003, a LAN communication control device 1004, and an input/output device 1005. The secondary storage device 1001 includes the metadata DB 101 and the agreement DB 102.

The secondary storage device 1001 stores a metadata matching program 1011, a metadata matching score accounting program 1012, and an operating system 1013. Note that the secondary storage device 1001 is a hard disk for example, but may be any device as long as it is a device that can perform storage. Examples of the secondary storage device 1001 include a semiconductor memory, a magnetic storage device, an optical storage device, a magneto-optical disk, and a storage device to which a phase-change recording technology is applied. The metadata matching program 1011 is a program for realizing the processing shown in the flowchart of FIG. 7, and the metadata matching score accounting program 1012 is a program for realizing the processing shown in the flowchart of FIG. 8. The operating system 1013 is used to control the overall processing performed by the match maker 100.

By referencing the volatile memory 1003, the CPU 1002 executes, under the control of the operating system 1013, actual processing (calculation) based on the metadata matching program 1011 and the metadata matching score accounting program 1012. The LAN communication control device 1004 is connected to the internet via a router 1006 connected to a LAN line, so that data obtained from the data provider 103 and the data user 104 is received by the match maker 100 as a result of being input to the input/output device 1005, and a data flow control instruction output by the input/output device 1005 is given to the distributor 105.

According to the above-described embodiment, pieces of attribute information shared between provided metadata are put together in one location, and thus the amount of provided metadata that needs to be referenced is reduced. Furthermore, the memory or database required to store provided metadata can be downsized. In other words, it is possible to reduce the memory amount, and also reduce the use of the CPU when metadata is used.

Furthermore, when provided metadata is generated, an inheritance source metadata ID is used to reuse metadata, resulting in an improvement in the generation efficiency. Furthermore, in matching between provided metadata and usable metadata, the total range of metadata to be compared is reduced, and thus it is possible to reduce the time required to perform matching processing, thus increasing the use efficiency of CPU resources. Moreover, the entire processing including matching is streamlined, and the quality of the data obtained by the matching is improved.

The device according to the present invention can also be realized by a computer and a program, and the program can be recorded in a recording medium or be provided through a network.

Furthermore, the above-described devices and part of the devices can be implemented by a hardware configuration, or a combination of a hardware resource and software. As the software of the combination, a program for causing a computer to realize the functions of the devices is used, the program being installed in advance in the computer from a network or a computer-readable recording medium, and being executed by a processor of the computer.

Note that the present invention is not limited to the above-described embodiment exactly, and may be embodied in the execution stage with its constituent components modified without departing from the spirit of the invention. Also, various inventions may be realized by appropriately combining the plurality of constituent components disclosed in the above-described embodiment. For example, some of the constituent components shown in the embodiment may also be omitted. Furthermore, constituent components of different embodiments may also be combined with each other as appropriate.

Furthermore, part or all of the embodiments may be described as the following appendixes, but the present invention is not limited to them.

APPENDIX 1

An instruction device comprising: a hardware processor; and a memory,
wherein the hardware processor is configured to:
acquire provided metadata, which is attribute information relating to one or more attributes of sensing data to be output from a sensor, the provided metadata having one or more hierarchy levels that contain information shared by a plurality of sensors;

acquire usable metadata, which is attribute information relating to one or more attributes of an application that uses sensing data to provide a service;

perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching degree, which is a sum of the inter-level matching degrees of all of the hierarchy levels; and transmit a data flow control instruction that specifies the application that corresponds to the usable metadata and the extracted sensor based on the overall matching degree, to a managing device, which manages control of transmitting data of a predetermined sensor to a predetermined application, and the memory includes:

a provided data storage unit configured to store the provided metadata;

a usable data storage unit configured to store the usable metadata; and a matching result storage unit configured to store the inter-level matching degrees of all of the hierarchy levels.

APPENDIX 2

An instruction system comprising:

a hierarchization device provided with a first hardware processor and a first memory; and an instruction device provided with a second hardware processor and a second memory, wherein, in the hierarchization device, the first memory stores metadata, which is attribute information relating to one or more attributes of sensing data to be output from a sensor, and the first hardware processor is configured to acquire the metadata from a plurality of sensors, classify the acquired metadata into pieces of metadata that contain information shared by the plurality of sensors, and hierarchize the metadata acquired from the plurality of sensors such that each of the pieces of metadata corresponds to any of the one or more hierarchy levels, and the lower the hierarchy level is, the smaller the number of sensors to which the metadata corresponds is, and in the instruction device, the second hardware processor is configured to:

acquire provided metadata, which is attribute information relating to one or more attributes of sensing data to be output from a sensor, the provided metadata having one or more hierarchy levels that contain information shared by a plurality of sensors;

acquire usable metadata, which is attribute information relating to one or more attributes of an application that uses sensing data to provide a service;

perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching degree, which is a sum of the inter-level matching degrees of all of the hierarchy levels;

transmit a data flow control instruction that specifies the application that corresponds to the usable metadata and the extracted sensor based on the inter-level matching degrees, to a managing device, which manages control of transmitting data of a predetermined sensor to a predetermined application, and the second memory includes:

a provided data storage unit configured to store the provided metadata;

a usable data storage unit configured to store the usable metadata; and a matching result storage unit configured to store the inter-level matching degrees of all of the hierarchy levels.

APPENDIX 3

An instruction method comprising the steps of:

acquiring, using at least one hardware processor, provided metadata, which is attribute information relating to one or more attributes of sensing data to be output from a sensor, the provided metadata having one or more hierarchy levels that contain information shared by a plurality of sensors;

acquiring, using at least one hardware processor, usable metadata, which is attribute information relating to one or more attributes of an application that uses sensing data to provide a service;

performing, using at least one hardware processor, matching between the provided metadata obtained from a provided metadata storage unit in which the provided metadata is stored and the usable metadata obtained from a usable metadata storage unit in which the usable metadata is stored for each hierarchy level, calculating, for each hierarchy level, an inter-level matching degree that indicates a degree of matching in the hierarchy level, and extracting a sensor capable of providing the sensing data that satisfies a request of the application, based on the inter-level matching degrees; and transmitting, using at least one hardware processor, a data flow control instruction that specifies the application that corresponds to the usable metadata and the extracted sensor based on the inter-level matching degrees obtained from a matching result storage unit in which the inter-level matching degrees of all of the hierarchy levels are stored, to a managing device, which manages control of transmitting data of a predetermined sensor to a predetermined application.

The invention claimed is:

1. An instruction device comprising a processor configured with a program to perform operations comprising:

operation as a provided data acquiring unit configured to acquire provided metadata, which is attribute information relating to one or more attributes of sensing data to be output from a sensor, the provided metadata arranged according to a hierarchy having one or more hierarchy levels that contain information shared by a plurality of sensors;

operation as a provided data storage unit configured to store the provided metadata;

operation as a usable data acquiring unit configured to acquire usable metadata, which is attribute information relating to one or more attributes of an application that uses sensing data to provide a service;

operation as a usable data storage unit configured to store the usable metadata;

operation as a matching unit configured to perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching degree, which is a sum of the inter-level matching degrees of all of the hierarchy levels;

operation as a matching result storage unit configured to store the overall matching degree; and operation as an instruction unit configured to transmit a data flow control instruction that specifies the application that corresponds to the usable metadata and the extracted sensor based on the overall matching degree, to a managing device, which manages control of transmitting data of a predetermined sensor to a predetermined application.

2. The instruction device according to claim 1,
wherein the processor is configured with the program such that operation as the matching unit comprises:
   operation as a hierarchical data checking unit configured to check an identification sign contained in the provided metadata, the identification sign indicating a link to another hierarchy level;
   operation as a hierarchical data acquiring unit configured to acquire provided metadata of the hierarchy level that corresponds to the identification sign from the provided data storage unit; and
   operation as a hierarchical data matching unit configured to perform matching between the provided metadata of the sensor acquired for each hierarchy level and the usable metadata, and calculate the inter-level matching degree.

3. The instruction device according to claim 2,
wherein, the processor is configured with the program such that operation as the matching unit comprises, before calculating an inter-level matching degree of matching between given provided metadata and given usable metadata, checking whether or not a corresponding calculated inter-level matching degree is stored in the matching result storage unit, and if it is confirmed that the corresponding inter-level matching degree is stored, calculating a matching degree of the matching is omitted.

4. The instruction device according to claim 2,
wherein the processor is configured with the program such that operation as the matching unit comprises performing matching between the provided metadata and the usable metadata for each hierarchy level, calculating, for each sensor, an overall matching degree indicating a matching degree of the matching with the usable metadata based on the inter-level matching degrees, and extracting a sensor capable of providing the sensing data that satisfies a request of the application based on the overall matching degree, the processor is configured with the program such that operation as the matching result storage unit comprises storing the overall matching degree of the matching with the usable metadata for each sensor, and the processor is configured with the program such that operation as the instruction unit comprises transmitting a data flow control instruction that specifies the application that corresponds to the usable metadata and the extracted sensor, based on the overall matching degree.

5. The instruction device according to claim 2,
wherein the processor is configured with the program such that operation as the provided data acquiring unit comprises acquiring the provided metadata by acquiring metadata, which is attribute information relating to one or more attributes of the sensing data, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is.

6. The instruction device according to claim 2,
wherein the hierarchy includes one or more tree structures with one or more branches derived from a highest hierarchy level of the hierarchy levels, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

7. A non-transitory computer-readable storage medium storing a program for causing a computer to function as the instruction device according to claim 2.

8. The instruction device according to claim 1,
wherein, the processor is configured with the program such that operation as the matching unit comprises, before calculating an inter-level matching degree of matching between given provided metadata and given usable metadata, checking whether or not a corresponding calculated inter-level matching degree is stored in the matching result storage unit, and if it is confirmed that the corresponding inter-level matching degree is stored, calculating a matching degree of the matching is omitted.

9. The instruction device according to claim 8,
wherein the processor is configured with the program such that operation as the matching unit comprises performing matching between the provided metadata and the usable metadata for each hierarchy level, calculating, for each sensor, an overall matching degree indicating a matching degree of the matching with the usable metadata based on the inter-level matching degrees, and extracting a sensor capable of providing the sensing data that satisfies a request of the application based on the overall matching degree, the processor is configured with the program such that operation as the matching result storage unit comprises storing the overall matching degree of the matching with the usable metadata for each sensor, and the processor is configured with the program such that operation as the instruction unit comprises transmitting a data flow control instruction that specifies the application that corresponds to the usable metadata and the extracted sensor, based on the overall matching degree.

10. The instruction device according to claim 8,
wherein the processor is configured with the program such that operation as the provided data acquiring unit comprises acquiring the provided metadata by acquiring metadata, which is attribute information relating to one or more attributes of the sensing data, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is.

11. The instruction device according to claim 8, wherein the hierarchy includes one or more tree structures with one or more branches derived from a highest hierarchy level of the hierarchy levels I, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

12. The instruction device according to claim 1, wherein the processor is configured with the program such that:
operation as the matching unit comprises performing matching between the provided metadata and the usable metadata for each hierarchy level, calculating, for each sensor, an overall matching degree indicating a matching degree of the matching with the usable metadata based on the inter-level matching degrees, and extracting a sensor capable of providing the sensing data that satisfies a request of the application based on the overall matching degree,
operation as the matching result storage unit comprises storing the overall matching degree of the matching with the usable metadata for each sensor, and
operation as the instruction unit comprises transmitting a data flow control instruction that specifies the application that corresponds to the usable metadata and the extracted sensor, based on the overall matching degree.

13. The instruction device according to claim 12, wherein the processor is configured with the program such that operation as the provided data acquiring unit comprises acquiring the provided metadata by acquiring metadata, which is attribute information relating to one or more attributes of the sensing data, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is.

14. The instruction device according to claim 12, wherein the hierarchy includes one or more tree structures with one or more branches derived from a highest hierarchy level of the hierarchy levels, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

15. The instruction device according to claim 1, wherein the processor is configured with the program such that operation as the provided data acquiring unit comprises acquiring the provided metadata by acquiring metadata, which is attribute information relating to one or more attributes of the sensing data, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is.

16. The instruction device according to claim 15, wherein the hierarchy includes one or more tree structures with one or more branches derived from a highest hierarchy level of the hierarchy levels, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

17. The instruction device according to claim 1, wherein the hierarchy includes one or more tree structures with one or more branches derived from a highest hierarchy level of the hierarchy levels, the highest hierarchy level corresponds to one piece of provided metadata shared by a plurality of sensors, the one or more tree structures being such that the lower the hierarchy level is, the smaller the number of sensors to which the metadata specific thereto corresponds is, and the lowest branch is in the lowest hierarchy level corresponding to provided metadata specific to one sensor.

18. A non-transitory computer-readable storage medium storing a program for causing a computer to function as the instruction device according to claim 1.

19. An instruction system comprising:
a hierarchization device; and an instruction device,
wherein the hierarchization device comprises a processor configured with a program to perform operations comprising acquiring metadata, which is attribute information relating to one or more attributes of sensing data to be output from a sensor, from a plurality of sensors, classifying the acquired metadata into pieces of metadata that contain information shared by the plurality of sensors, and hierarchizing the metadata acquired from the plurality of sensors such that each of the pieces of metadata corresponds to any of the one or more hierarchy levels, and the lower the hierarchy level is, the smaller the number of sensors to which the metadata corresponds is, and
the instruction device comprises a processor configured with a program to perform operations comprising:
operation as a provided data acquiring unit configured to acquire provided metadata, which is attribute information relating to one or more attributes of sensing data to be output from a sensor, the provided metadata having one or more hierarchy levels that contain information shared by a plurality of sensors;
operation as a provided data storage unit configured to store the provided metadata;
operation as a usable data acquiring unit configured to acquire usable metadata, which is attribute information relating to one or more attributes of an application that uses sensing data to provide a service;

operation as a usable data storage unit configured to store the usable metadata;

operation as a matching unit configured to perform matching between the provided metadata and the usable metadata for each hierarchy level, calculate, for each hierarchy level, an inter-level matching degree that indicates a degree of matching in the hierarchy level, and extract a sensor capable of providing the sensing data that satisfies a request of the application, based on an overall matching degree, which is a sum of the inter-level matching degrees of all of the hierarchy levels;

operation as a matching result storage unit configured to store the overall matching degree; and operation as an instruction unit configured to transmit a data flow control instruction that specifies the application that corresponds to the usable metadata and the extracted sensor based on the overall matching degree, to a managing device, which manages control of transmitting data of a predetermined sensor to a predetermined application.

20. An instruction method comprising:

acquiring provided metadata, which is attribute information relating to one or more attributes of sensing data to be output from a sensor, the provided metadata having one or more hierarchy levels that contain information shared by a plurality of sensors;

acquiring usable metadata, which is attribute information relating to one or more attributes of an application that uses sensing data to provide a service;

performing matching between the provided metadata obtained from a provided metadata storage unit in which the provided metadata is stored and the usable metadata obtained from a usable metadata storage unit in which the usable metadata is stored for each hierarchy level, calculating, for each hierarchy level, an inter-level matching degree that indicates a degree of matching in the hierarchy level, and extracting a sensor capable of providing the sensing data that satisfies a request of the application, based on an overall matching degree, which is a sum of the inter-level matching degrees of all of the hierarchy levels; and transmitting a data flow control instruction that specifies the application that corresponds to the usable metadata and the extracted sensor based on the overall matching degree obtained from a matching result storage unit in which the overall matching degree is stored, to a managing device, which manages control of transmitting data of a predetermined sensor to a predetermined application.

* * * * *